Oct. 21, 1969 D. DANIELS 3,473,829
INFLATABLE CONNECTOR
Filed May 8, 1967 4 Sheets-Sheet 2

INVENTOR.
Dennis Daniels
BY
*Popp and Sommer*
ATTORNEYS

INVENTOR.
Dennis Daniels
BY Popp and Sommer
ATTORNEYS

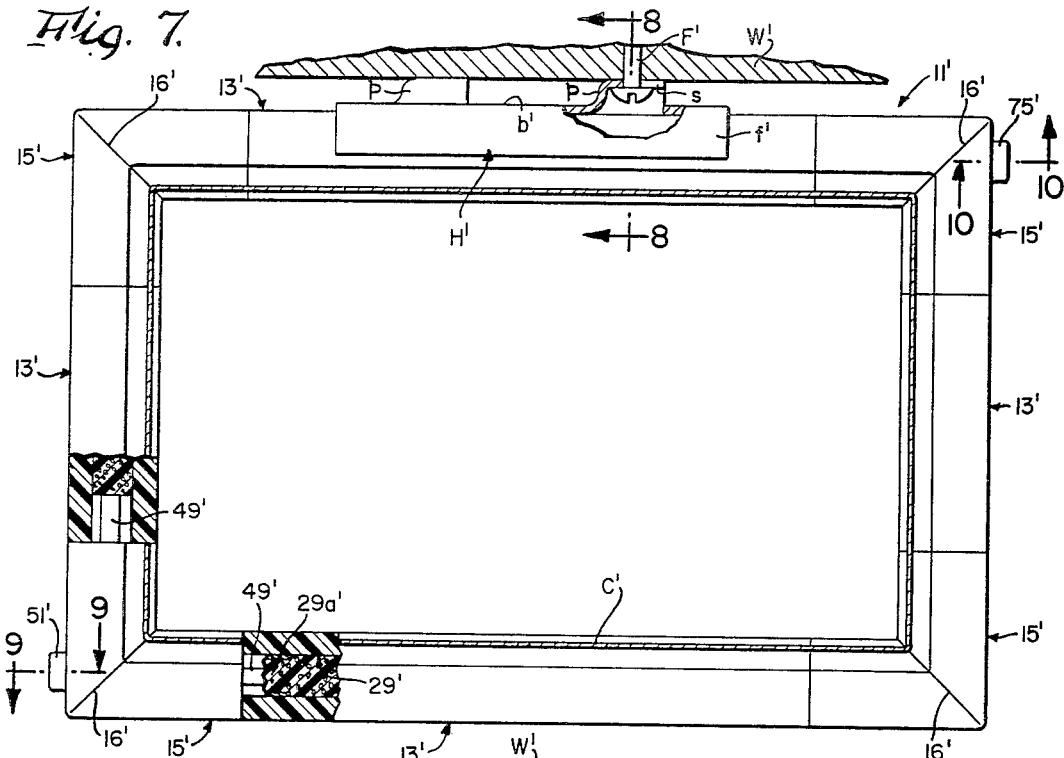
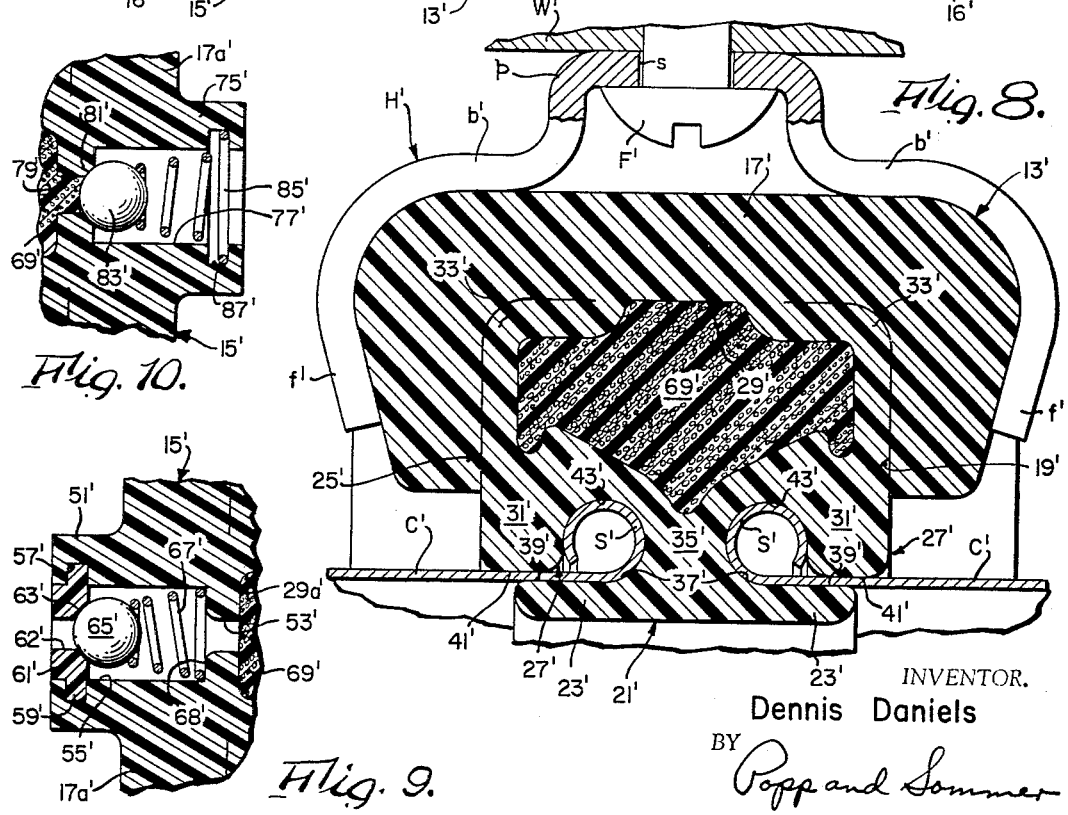

United States Patent Office 3,473,829
Patented Oct. 21, 1969

3,473,829
INFLATABLE CONNECTOR
Dennis Daniels, Williamsville, N.Y., assignor of one-half interest to Frontier Insulation & Asbestos Inc., Buffalo, N.Y., a corporation of New York
Filed May 8, 1967, Ser. No. 636,736
Int. Cl. F16l 55/00, 35/00
U.S. Cl. 285—18                            6 Claims

ABSTRACT OF THE DISCLOSURE

An inflatable connector for clamping opposed peripheral salients on hollow conduits comprises an elongated elastomeric body including in cross-section a base portion and a clamping portion including oppositely extending flange portions and movable and deformable jaw portions spaced from the flange portions to form oppositely extending slots for receiving the salients and spaced from each other and the base portion to form an inflatable cavity, and valve structure for expanding and filling the cavity with fluid for moving and deforming the jaw portions apart and around the salients to close the slots and clamp the salients therein.

---

The present invention relates to improvements in connectors, and more particularly to a new and improved inflatable connector for structural members such as conduits.

In assembling various structural members, especially metal conduits or ducts for transporting fluids, such as air, it is desirable that these structural members be quickly and easily assembled in the field without the need for special assembly tools, and that the joints be firm and sealed, as well as free from metal-to-metal contact and vibration.

Accordingly, it is an object of the invention to provide such an inflatable connector which is so constructed and designed as to facilitate such assembly without the need for special assembly tools.

Another object is to provide such an inflatable connector which is so constructed and designed as to provide firm and well sealed joints which are free from metal-to-metal contact and vibration.

Another object is to provide such an inflatable connector which is so constructed and designed as to provide preferably for permanent joints, but also for temporary joints which may be disassembled readily.

Another object is to provide such an inflatable connector which is so constructed and designed as to provide joints between structural members of various sizes and shapes, and particularly hollow conduits of circular or rectangular cross-section.

Another object is to provide such an inflatable connector which is so constructed and designed as to temporarily hold the structural members prior to inflation in order to facilitate assembly, as well as to securely clamp such members following inflation.

Another object is to provide such an inflatable connector which is relatively simple in construction for economy of manufacture, as well as effective and efficient in operation.

These objects are accomplished by an inflatable connector for a structural member having a salient portion, such connector comprising an elastomeric body including in cross-section a base portion and a clamping portion extending outwardly from the base portion. The clamping portion includes a flange portion connected to the base portion by a movable and deformable jaw portion spaced from the flange portion to form therewith a slot adapted to receive the salient portion and spaced from the base portion to form therebetween an inflatable cavity. The connector also includes means adapted to expand and fill the cavity with fluid for moving and deforming the jaw portion around the salient portion to close the slot and clamp the salient portion therein.

The above and other objects and advantages of the invention will become more apparent upon consideration of the following detailed description and accompanying drawings wherein.

FIG. 7 is a transverse section through one of two rectangular conduits and showing another preferred embodiment of the inventive connector inflated in place around the conduit, supported by a hanger from an overhead wall and including four long and straight major body portions connected to four short and L-shaped, minor body portions at the corners of the conduit, with portions being broken away to illustrate underlying structure;

FIG. 8 is an enlarged section taken on line 8—8 of FIG. 7 and showing the cross-sectional structure of the uppermost major body portion after being inflated to clamp the opposed salient portions of the two rectangular conduits;

FIG. 9 is an enlarged fragmentary section taken on line 9—9 of FIG. 7 and showing an inlet valve associated with one of the minor body portions, and FIG. 10 is an enlarged fragmentary section taken on line 10—10 of FIG. 7 and showing an outlet valve associated with another minor body portion.

Figure 1:
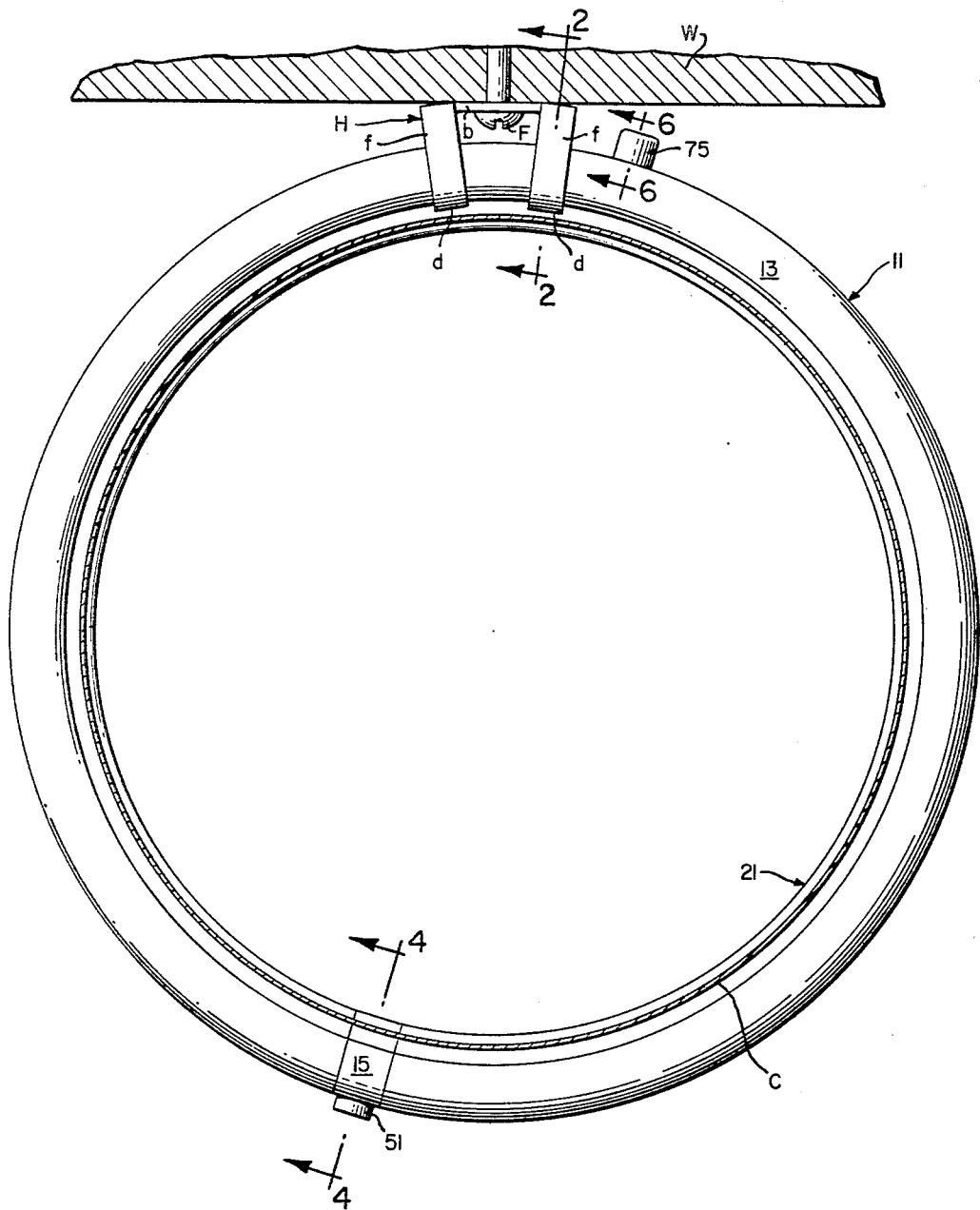
FIG. 1 is a transverse section through one of two circular conduits and showing one preferred embodiment of the inventive connector inflated in place around the conduit, supported by a hanger from an overhead wall and including a long major body portion connected to a short minor body portion.
Figure 2:
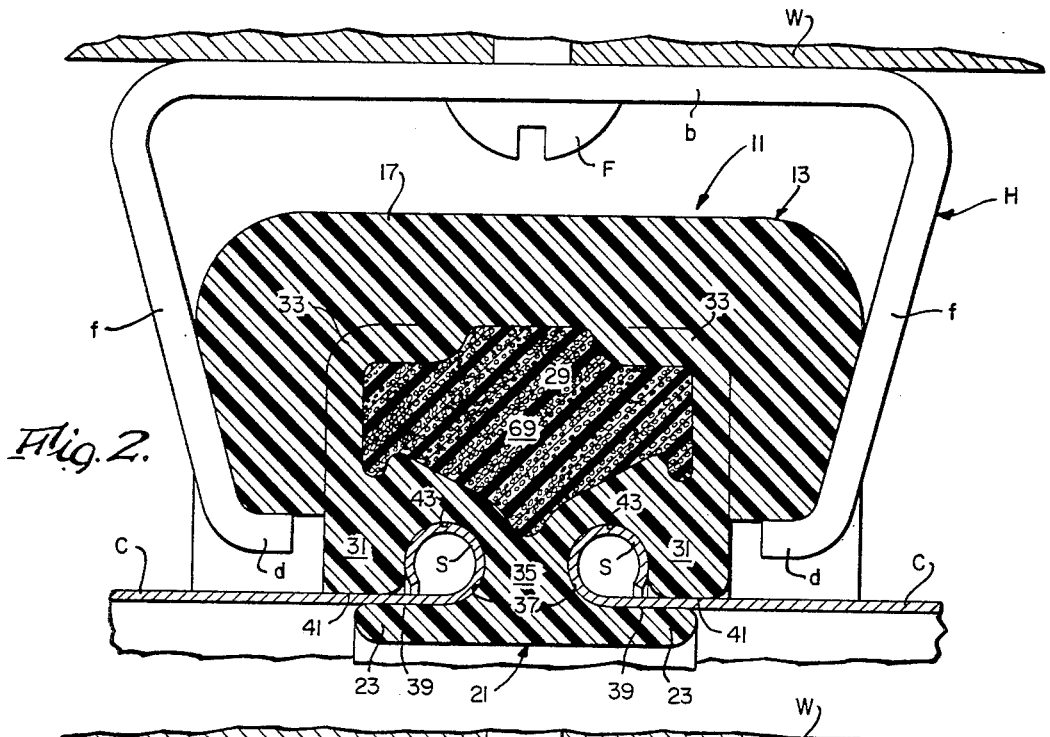
FIG. 2 is an enlarged section taken on line 2—2 of FIG. 1 and showing the cross-sectional structure of the major body portion of the inventive connector after being inflated to clamp the opposed salient portions of the two circular conduits.
Figure 3:
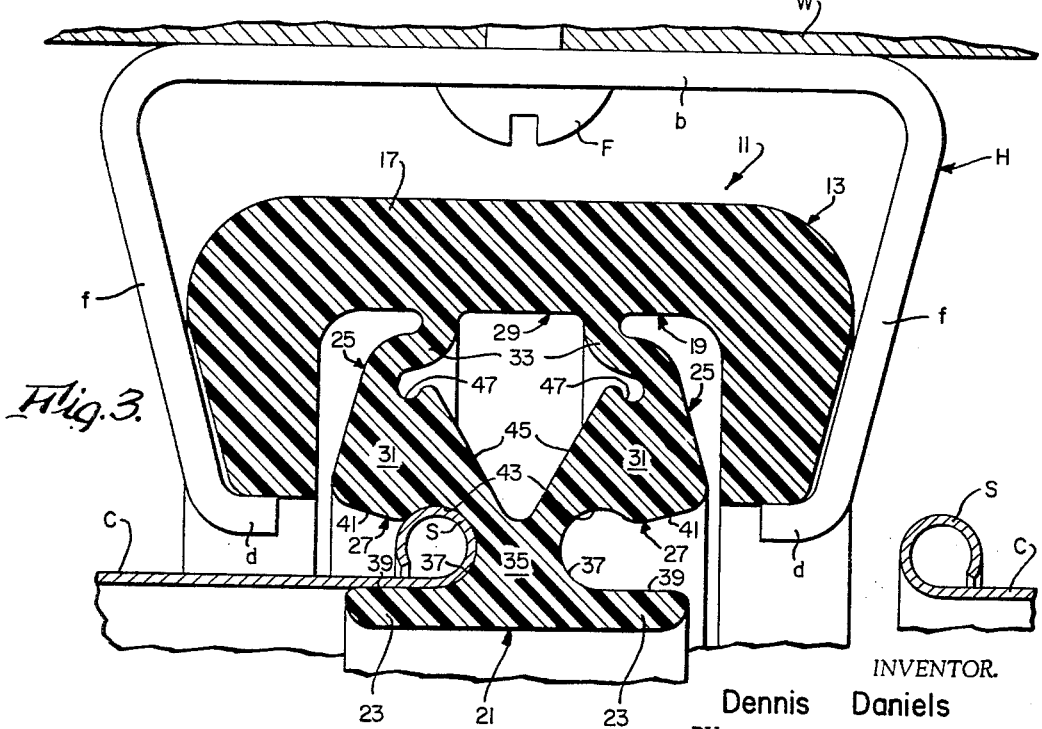
FIG. 3 is a view similar to FIG. 2 but showing the cross-sectional structure of such major body portion prior to inflation, with one of the conduits being removed.

Referring to the drawings, and particularly FIGS. 1–3, a preferred embodiment of the inventive inflatable connector is generally indicated at 11, and is shown joining two structural members in the form of hollow conduits C of circular cross-section and having opposed salient portions S in the form of rolled edges extending around their outer peripheries. Connector 11 and conduits C are supported at their junctures in any suitable manner, such as by a metal hanger H having an elongated flat base portion *b* secured to a support such as a ceiling wall W by a screw or similar fastener F. Base portion *b* is provided with longitudinally spaced pairs of depending flange portions *f*, with the flange portions on each side of the base portion converging downwardly as shown in FIG. 1, and the flange portions of each pair also converging downwardly, as shown in FIG. 3. Each flange portion *f* is adapted to be engaged by a portion of connector 11 and terminates in an inwardly turned distal lug portion *d* adapted to fit beneath and support such portion of connector 11, as best seen in FIGS. 2 and 3, and as will be described in greater detail below.

As shown in FIG. 1, connector 11 includes an elongated body which is adapted to be curved to conform to the circular shape of the outer peripheries of conduits C and to clamp rolled edges S throughout their length. To this end, the body is formed of any suitable elastomeric material such as a plastisol, viz. polyvinyl chloride, butane rubber, or polyethylene, and preferably includes at least one long major body portion 13 which is cut to length from preferably a one-piece straight extrusion and is adapted to be connected to and bonded with at least one short minor body portion 15, which preferably is molded in one piece as a straight member from the same or similar elastomeric material as major body portion 13. Because of the elastomeric nature of these body portions, they readily conform to the arcuate cross-sectional shape of conduits C.

As best seen in FIG. 3, the major body portion 13 preferably includes in cross-section a generally channel-shaped base portion 17 which is adapted to be engaged and supported by flange portions *f* and distal lug portions *d* of hanger H, as noted above, and which is provided with a central recess 19. Arranged within, but not filling recess 19, and extending outwardly from base portion 17 is an irregularly shaped clamping portion generally indicated at 21 and including oppositely extending flange portions 23 connected to base portion 17 by movable and deformable jaw portions generally indicated at 25. These jaw portions are spaced from flange portions 23 to form therewith oppositely extending slots 27 adapted to receive rolled edges S, jaw portions 25 also are spaced from each other and base portion 17 to form therebetween an inflatable cavity portion 29. The jaw portions include enlarged nose sections 31 of generally triangular shape and connected to base portion 17 at first apex areas by elongated and spaced apart, thin wall sections 33 curving outwardly from base portion 17. Nose sections 31 also are connected to flange portions 23 at second apex areas by a common neck section 35 having oppositely disposed recessed concave surfaces 37 merging with the adjacent surfaces 39 of flange portions 23. Nose sections 31 are provided with external surfaces 41 converging from third apex areas toward third adjacent surfaces 39 to form tapered entrances to slots 27, and are cut away adjacent neck section 35 to provide recessed concave surfaces 43 merging and forming with concave surfaces 37 enlarged and greater than semi-circular detents within slots 27, for temporarily holding rolled edges S prior to expansion of cavity portion 29. In addition, nose sections 31 have internal surfaces 45 diverging from neck section 35 and external surfaces 41 to form tapered cavity wall portions, and these internal surfaces are cut away adjacent thin wall sections 33 to form pockets 47 within cavity portion 29, in order to facilitate the desired movement and deformation of nose sections 31 and thin wall sections 33 of jaw portions 25 during expansion and filling of cavity portion 29.

Figure 4:
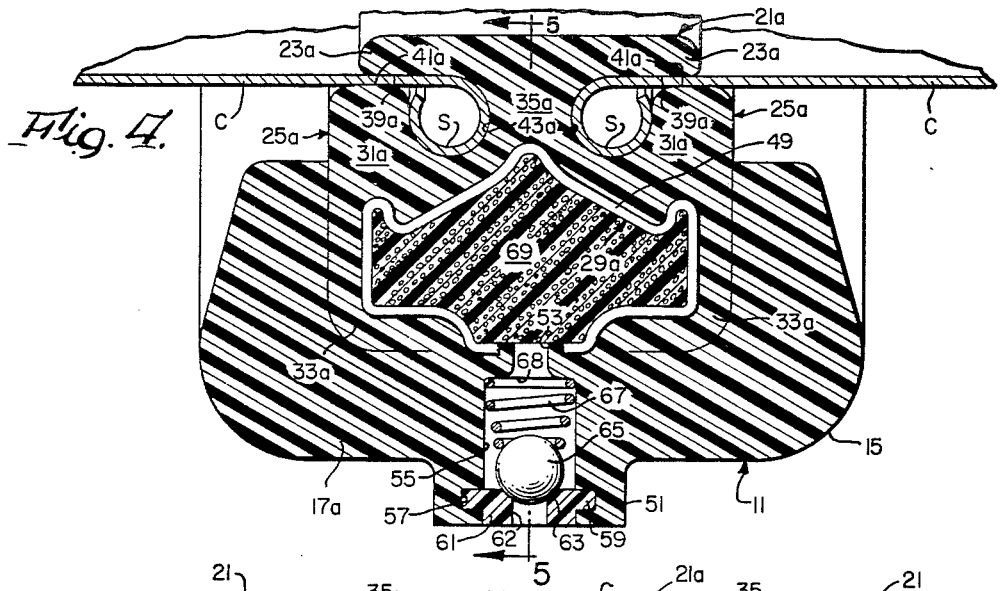
FIG. 4 is an enlarged section taken on line 4—4 of FIG. 1 and showing the cross-sectional structure of the minor body portion after such inflation and an inlet valve associated therewith.
Figure 5:
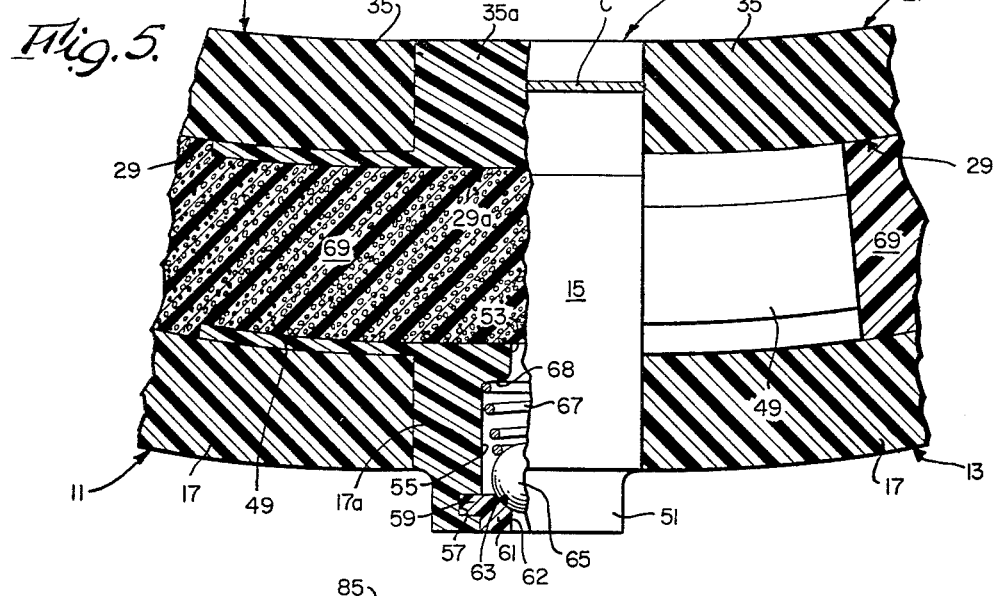
FIG. 5 is an enlarged fragmentary section taken on line 5—5 of FIG. 4 with a portion broken away to show the longitudinal sectional structure of the major and minor body portions where connected.

Referring to FIGS. 1, 4 and 5 in particular, the minor body portion 15 is practically identical in cross-section to that of major body portion 13 just described. Hence, no detailed description of the various similar parts is necessary, and like numerals are used for like parts with the parts of minor body portion 15 corresponding to major body portion 13 being differentiated by the letter *a* following each numeral.

However, minor body portion 15 does differ in the following important respect. First its cavity portion 29*a* is slightly smaller than that of major body portion 13 because it is provided with outstanding and oppositely extending hollow lug portions 49 conforming in shape to and adapted to fit longitudinally in cavity portion 29 within major body portion 13. As best seen in FIGS. 1 and 5, minor body portion 15 is quite short as compared to elongated major body portion 13, and is of generally rectangular shape in outline (except for the outstanding lug portions 49) and is elongated transversely of the major body portion, which when extruded, is normally generally straight and of generally rectangular shape elongated longitudinally. However, as shown in FIG. 5, the end surfaces of the various parts of minor body portion 15, such as base portion 17*a* and neck portion 35*a*, are adapted to mate with corresponding end surfaces of the corresponding parts of major body portion 13, such as base portion 17 and neck portion 35. Likewise, the outer surfaces of conforming lug portions 49 are adapted to mate with the inner surfaces of cavity portion 29. Thus, these major and minor body portions are adapted to be connected and bonded together readily by any suitable and preferably quick-drying adhesive (not shown) interposed between such mating surfaces, in order to produce the desired unified elongated body having an inflatable cavity and adapted to clamp rolled edges S throughout their length.

Minor body portion 15 further differs from major body portion 13 in that it preferably includes at least part of the means for expanding and filling cavity portions 29 and 29*a*, namely the inlet valve structure. To this end, base portion 17*a* is provided with a preferably cylindrical extension 51, and has a through bore 53 which is enlarged to provide a cylindrical valve chamber 55 having an annular notch 57 arranged in extension 51. The outstanding annular flange portion 59 of hollow annular cap member 61 is adapted to be snapped and bonded in place within notch 57, and may be made of any suitable material, such as the same or similar elastomeric material as minor body portion 15. Cap member 61 is provided with a through bore 62 which is cut away at its inner end to provide a concave annular valve seat 63 for a spherical metal ball valve closure member 65 which is resiliently biased against the seat to close the valve structure by a tapered metal coil spring 67 having its larger end engaging the shoulder 68 formed between bore 53 and chamber 55. As will be evident, this inlet valve structure is normally closed, and can only be opened by an external pressure greater than that within cavity portions 29 and 29*a*.

When it is desired to form a temporary joint which may be readily disassembled, the above described inlet valve structure is all that is necessary to complete the inventive connector structure. For example, in areas of relatively stable temperature, a gaseous type fluid, such as air, could readily be pumped into the inflatable cavity portions to expand and fill the same and to cause the jaw portions 25, shown in FIG. 3, to be moved apart and deformed to fill recess 19, and to expand body portion 17 into firm engagement with hanger flange portions *f*, as well as to fit around rolled edges S, thereby closing slots 27 and clamping the rolled edges therein, all as shown in FIG. 2. This action would, of course, provide the desired firm joints with hanger H and conduits C, with the latter joints being not only well sealed, but also free from metal-to-metal contact and vibration. Such joints can easily and quickly be assembled in the field, as well as disassembled by opening the inlet valve structure, all without the need for special assembly or disassembly tools. However, in areas of widely varying temperatures, the air pressure in the body cavity would vary with the temperature and could leak past the valve structure, with possible loss of the desired firmness and well sealed nature of the joints with conduits C.

Therefore, it is preferred that a solidifiable fluid, such as 69, shown in FIGS. 3–6, be used to form a permanent joint not substantially effected by such temperature changes. This fluid could be of any suitable material or materials compatible with the material or materials of the major and minor body portions. Where strength is not an important factor, such solidifiable fluid may be of a rigid foaming type, such as polyurethane, as shown in the drawings. This material can be injected in a wet state and expanded to form a rigid foamed or cellular structure. Where strength is an important factor, a voidless solid forming material, such as an epoxy resin, could be so injected in the wet state. Likewise, if so desired, the solidifiable fluid may incorporate various fillers such as fibrous material, for reinforcement purposes.

Figure 6:
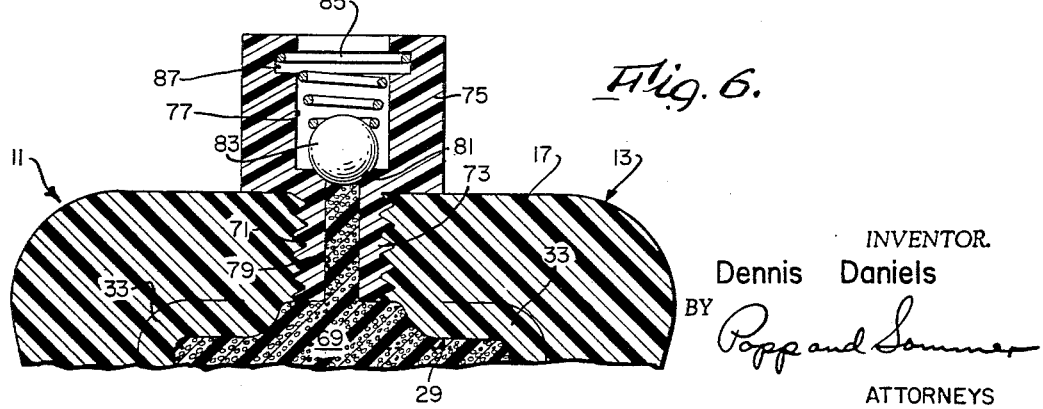
FIG. 6 is an enlarged fragmentary section taken on line 6—6 of FIG. 1 and showing the cross-sectional structure of an outlet valve associated with the major body portion.

Thus, when using a solidifiable fluid, such as 69, it is necessary that the means for expanding and filling the cavity portions 29 and 29a also include an outlet or purging valve structure. To this end, as shown in FIGS. 1 and 6, preferably base portion 17 of major body portion 13 is provided with an internally threaded through bore 71 receiving and preferably adhesively bonded with the externally threaded stem portion 73 of a hollow, cylindrical outlet valve body 75, which may be made of any suitable material, such as the same or similar elastomeric material as body portion 13. This valve body is provided with an enlarged bore forming a valve chamber 77 communicating with a reduced bore 79 extending through stem portion 71 and cut away at its juncture with valve chamber 77 to provide a concave annular valve seat 81 for a spherical metal ball valve closure member 83, which is normally biased to the closed position shown by a tapered metal coil spring 85, the larger end of which is snapped into an annular notch 87 provided in valve body 75 adjacent the outer open end of valve chamber 77.

As will be evident, upon injection of solidifiable fluid 69 into the cavity portions, this outlet valve structure will permit any air trapped in the cavity portions 29 and 29a to be expelled during expansion and filling of such cavity portions. Completion of the filling and expanding operation will be indicated by any oozing of the solidifiable fluid out through the outlet valve structure, at which point the injection thereof can be stopped, whereupon both the inlet and outlet valve structures will close, to maintain such fluid within the cavity portions.

In assembling the joint shown in FIGS. 1–6 in the field, the major body portion 13 is cut to the desired length, and may be passed through the flange portions *f* of the previously installed hanger H, as shown in FIG. 3, with base portion 17 fitting loosely within flange portions *f* and resting upon distal lug portions *d*. Then, the major and minor body portions may be connected and bonded together to provide the desired annular shape. Alternatively, the major and minor body portions could be assembled either before or after forcibly springing resilient hanger flange portions *f* apart to permit base portion 17 of major body portion 13 to be snapped in place. Typically, a series of conduits are to be installed, and following installation of the various hangers H and connectors 11, the opposing rolled edges S of adjacent conduits are snapped in place into the detents in slots 27, as shown in FIG. 3, whereupon the conduits are temporarily held in place prior to inflation of the body cavities. When the various conduits C are so supported, it is but a simple matter to inject the solidifiable fluid into each joint under pressure by any suitable means (not shown), until the various joints are completed.

As will be seen from a comparison of FIGS. 2 and 3, injection of the solidifiable fluid 69 into cavity portion 29 causes the jaw portions 25 to be moved and deformed apart from their original positions of FIG. 3 to those of FIG. 2. During such expansion and filling of cavity portion 29, thin wall sections 33 are stretched considerably in length and nose sections 31 are moved apart and deformed until recess 19 in base portion 17 is filled, with nose sections 31 continuing to move and deform around rolled edges S until they close slots 27 and clamp rolled edges S therein by engaging the outer peripheries of conduits C adjacent such rolled edges, with the inner peripheries of such conduits being engaged by flange portions 23. It also is to be noted that this expansion operation causes base portion 17 of major body portion 13 to be expanded laterally to firmly engage hanger flange portions *f*. As is evident from FIGS. 4 and 5, the expansion and filling of cavity portion 29a in minor body portion 15 occurs in substantially the same manner to produce the desired overall result of a unified elongated body clamping the rolled edges S throughout their length.

Hence, there results firm joints not only between connector 11 and hanger H, but also between the connector 11 and conduits C, with the latter joints being well sealed and free from metal-to-metal contact and vibration. Likewise, the assembly of such joints is quickly and easily accomplished in the field, without the need for special assembly tools.

Another preferred embodiment of the inventive connector is shown in FIGS. 7–10, wherein this embodiment clamps two structural members in the form of hollow conduits of elongated rectangular cross-section. In view of the overall similarity in the construction of the supporting structure, two series of conduits and the two embodiments, corresponding parts are indicated by the same letters and numerals, with the parts of the supporting structure, rectangular conduits and second embodiments being differentiated from the parts of the supporting structure, circular conduits and first embodiment by a prime (′) following each numeral.

Thus, the second embodiment is generally indicated at 11′ and is shown joining two hollow conduits C′ of elongated rectangular cross-section having opposed salient portions S′ in the form of rolled edges extending around their outer peripheries, with the connector and conduits being supported at their junctures in any suitable manner, such as by a metal hanger H′ having a flat base portion *b*′ secured to a support, such as ceiling wall W′ by two screws or like fasteners F′ (only one being shown). The heads of the screws F′ engage the undersides of longitudinally spaced portions *p* struck out from base portion *b*′ and provided with slots *s* (only one being shown) to facilitate assembly. A pair of longitudinally elongated flange portions *f*′ converge downwardly from each side of base portion *b*′, as shown in FIG. 3. These flange portions *f*′ engage a portion of connector 11′ and securely hold the same in place, as will be described in greater detail below.

As seen in FIGS. 7 and 8, connector 11′ includes an elongated body which is adapted to conform to the rectangular shape of the outer peripheries of conduits C′ and to clamp salient portions S′ throughout their length, and this body is formed of any suitable elastomeric material such as referred to above. The body includes four long and straight major body portions 13′ which are cut to length from preferably a one piece straight extrusion and adapted to be connected to and bonded with four minor body portions 15′, at the corners of the conduits. The upper and lower major body portions 13′ in FIG. 7, are slightly longer than the vertically disposed major body portions 13′, because of the horizontally elongated cross-sectional nature of conduits C′, while the four minor body portions 15′ are of angular, and actually L-shape to fit around the corners of the conduits C′. While each minor body portion 15′ may be molded to the desired L-shape in one piece from the same or similar material as major body portions 13′, it is preferred that each minor body portion be moulded as a one piece straight member which is notched, folded and bonded at 16′ to form the desired L-shape.

As will be evident from a comparison of FIG. 8 with FIGS. 2 and 3, the major body portions 13′ are identical in cross-section to major body portion 13, and therefore a detailed description of this cross-sectional structure is not necessary. Likewise, the cross-sectional structure of minor body portions 15′ corresponds to the cross-sectional structure of major body portion 13′ in the same manner as the cross-sectional structure of minor body portion 15 corresponds to that of major body portion 13, as shown in FIGS. 4 and 5. Therefore, no detailed recitation of this cross-sectional structure is necessary either. However, it is to be noted that lug portions 49′ extend outwardly from each minor body portion 15′ at 90° angles rather than in opposite directions, and that each cavity portion 29a' of each minor body portion 15' necessarily is of L-shape, as is such minor body portion. Of course, minor body portions 15' are shorter than major body portions 13', but the end surfaces of such major and minor body portions are adapted to mate with each other and the outer surfaces of lug portions 49' are adapted to mate with the inner surfaces of cavity portions 29' in major body portions 13'. Moreover, these major and minor body portions are adapted to be bonded together readily by any suitable and preferably quick-drying adhesive (not shown) interposed between such mating surfaces in order to produce the desired unified elongated body having an inflatable cavity and adapted to clamp rolled edges S' throughout their length.

In the preferred construction shown in FIGS. 7 and 9, the lower left hand body portion 15' includes part of the means for expanding and filling cavity portions 29' and 29a', namely the inlet valve structure. To this end, base portion 17a' is provided with cylindrical extension 51' and the various remaining parts making up the inlet valve structure, which is identical to that shown in FIGS. 4 and 5. Therefore, there is no need to go into detail on this structure either.

Just as in the previously described embodiment, such inlet valve structure would be all that would be required to expand and fill cavity portions 29' and 29a' with a gaseous fluid, such as air, for forming a temporary joint. However, once again it is preferred to form a permanent-type joint uneffected by temperature changes and to employ the solidifiable fluid 69'.

Hence, it is necessary that the means for expanding and filling cavity portion 29' and 29a' also include an outlet or purging valve structure. In the preferred construction shown in FIGS. 7 and 10, the upper right hand minor body portion 15' is provided with this structure, which could be the same as the outlet valve structure shown in FIG. 6. However, it is preferred that the outlet valve body 75' be formed integrally with the minor body portion 15' to eliminate the threaded stem portion 73 and threaded bore 71 in base portion 17'. Otherwise, the structure and operation are the same as that shown in FIG. 6, and no detailed description thereof is necessary.

In assembling connector 11' with hanger H' and conduits C', the major body portions 13' are cut to the desired length and preferably connected and bonded to minor body portions 15' in order to provide the desired rectangular shape conforming to the cross-sectional shape of the conduits C', followed by installation of a series of conduits C'. The hangers H' are suitably installed by securing the same with fasteners F', and because of slots s can be adjusted laterally for alinement purposes. The uppermost major body portion 13' is actually snapped in place within resilient flange portions f' by temporarily springing the same apart, and the opposed salient portions S' of each adjacent pair of conduits C' are temporarily held in place by the detents within slots 27', in the same manner as shown in FIG. 3. During expansion and filling of cavity portions 29' and 29a', the jaw portions 25' and 25a', not shown, are moved apart and deformed in the same manner as in the previously described embodiment, in order to fill the recesses within base portions 17' and 17a' and to close slots 27' and clamp salient portions S' therein, for producing the desired joints with conduits C'. A comparison of FIGS. 2 and 8 reveals this result. Also, in so expanding and filling the cavity portions, base portions 17' and 17a' are expanded laterally to more securely engage the adjacent surfaces of flange portions f' of hanger H', in order to provide a firm joint therebetween.

From the foregoing detailed description, it now is evident how each embodiment of the inventive connector accomplishes the objectives of the invention, and the numerous advantages of the invention likewise are apparent. While the invention has been described and illustrated herein by reference to two preferred embodiments, it is to be understood that such description is to be considered as illustrating rather than as limiting the invention.

What is claimed is:

1. An inflatable connector for a structural member having a salient portion, said connector comprising an elastomeric body including in cross-section a base portion having a recess and a clamping portion extending outwardly from said base portion, said clamping portion including a flange portion connected to said base portion by a movable and deformable jaw portion spaced from said flange portion to form therewith a slot adapted to receive said salient portion and spaced from said base portion to form therebetween an inflatable cavity, said jaw portion being arranged within but not filling said recess and including an enlarged nose section of generally triangular shape connected to said base portion at a first apex area by an elongated thin wall section curving outwardly from said base portion and to said flange portion at a second apex area by a neck section having a recessed surface merging with the adjacent surface of said flange portion, said nose section having an external surface converging from a third apex area toward said adjacent surface of said flange portion to form a tapered entrance to said slot and cut away adjacent said neck section to provide a recessed surface merging and forming with said recessed surface of said neck section an enlarged detent within said slot for temporarily holding said salient portion prior to expansion of said cavity, during which expansion said nose section is adapted to be moved and deformed around said salient portion to close said slot, and said nose section having an internal surface diverging from said neck section and external surface to form a tapered cavity wall portion and cut away adjacent said thin wall section to form a pocket within said cavity, to facilitate said movement and deformation of said nose section, and means adapted to expand and fill said cavity section with fluid for moving and deforming said jaw portion to fill said recess and for moving and deforming said nose section around said salient portion to close said slot and clamp said salient portion therein.

2. The connector of claim 1 wherein said structural member is a hollow conduit of generally annular cross-section and said salient portion extends around the outer periphery thereof in the form of a rolled edge, said recessed surfaces of said neck and nose sections are concave and said detent is arcuate for temporarily holding said rolled edge prior to expansion of said cavity, said body is elongated, adapted to conform to the annular shape of said conduit and to clamp said salient portion throughout its length and includes a long major body portion adapted to be connected to a short minor body portion, one of which is provided with an outstanding lug portion adapted to fit longitudinally in the other of said major and minor body portions, and said means include a normally closed inlet valve adapted to be associated with one of said major and minor body portions and to permit entry of solidifiable fluid into said cavity during expansion and filling thereof, and a normally closed outlet valve adapted to be associated with one of said major and minor body portions and to permit expulsion of gas from said cavity during filling and expansion thereof.

3. The connector of claim 1 wherein said structural member is a hollow conduit of generally polygonal cross-section and said salient portion extends around the outer periphery thereof in the form of a rolled edge, said recessed surfaces of said neck and nose sections are concave and said detent is arcuate for temporarily holding said rolled edge prior to expansion of said cavity, said body is elongated, adapted to conform to the polygonal shape of said conduit and to clamp said salient portion throughout its length and includes a plurality of long and generally straight, major body portions adapted to be connected to a plurality of short and generally angular, minor body portions at the corners of said conduit, ones of which major and minor body portions are provided with outstanding lug portions adapted to fit longitudinally in others of said major and minor body portions, and said means include a normally closed inlet valve adapted to be associated with one of said major and minor body portions and to permit entry of solidifiable fluid into said cavity during expansion and filling thereof, and a normally closed outlet valve adapted to be associated with one of said major and minor body portions and to permit expulsion of gas from said cavity during expansion and filling thereof.

4. An inflatable connector for structural members having opposed salient portions, said connector comprising an elastomeric body including in cross-section a base portion of generally channel shape and having a recess and a clamping portion extending outwardly from said base portion, said clamping portion including oppositely extending flange portions connected to said base portion by movable and deformable jaw portions spaced from said flange portions to form therewith oppositely extending slots adapted to receive said salient portions and spaced from each other and said base portion to form therebetween an inflatable cavity, said jaw portions being arranged in but not filling said recess and including enlarged nose sections of generally triangular shape connected to said base portion at first apex areas by elongated and spaced apart, thin wall sections curving outwardly from said base portion and to said flange portions at second apex areas by a common neck section having recessed surfaces merging with the adjacent surfaces of said flange portions, said nose sections having external surfaces converging from third apex areas toward said adjacent surfaces of said flange portions to form tapered entrances to said slots and cut away adjacent said neck section to provide recessed surfaces merging and forming with said recessed surfaces of said neck section enlarged detents within said slots for temporarily holding said salient portions prior to expansion of said cavity, during which expansion said nose sections are adapted to be moved and deformed around said salient portions to close said slots, and said nose sections having internal surfaces diverging from said nose section and external surfaces to form tapered cavity wall portions and cut away adjacent said thin wall sections to form pockets within said cavity to facilitate said movement and deformation of said nose sections, and means adapted to expand and fill said cavity with fluid for moving and deforming said jaw portions apart to fill said recess and for moving and deforming said nose sections around said salient portions to close said slots and clamp said salient portions therein.

5. The connector of claim 4 wherein said structural members are hollow conduits of generally circular cross-section and said salient portions extend around the outer peripheries thereof in the form of rolled edges, said recessed surfaces of said neck and nose sections are concave and said detents are arcuate for temporarily holding said rolled edges prior to expansion of such cavity, said body is elongated, adapted to conform to the circular shape of said conduits and to clamp said salient portions throughout their length and includes a long major body portion adapted to be connected to and bonded with a short minor body portion, one of which is provided with an outstanding hollow lug portion conforming in shape to and adapted to fit longitudinally in the portion of said cavity within the other of said major and minor body portions, and said means including a normally closed inlet valve adapted to be associated with said base portion of one of said major and minor body portions and to permit entry of solidifiable fluid into said cavity during expansion and filling thereof, and a normally closed outlet valve adapted to be associated with said base portion of one of said major and minor body portions and to permit expulsion of gas from said cavity during filling and expansion thereof.

6. The connector of claim 4 wherein said structural members are hollow conduits of generally rectangular cross-section and said salient portions extend around the outer peripheries thereof in the form of rolled edges, said recessed surfaces of said neck and nose sections are concave and said detents are arcuate for temporarily holding said rolled edges prior to expansion of said cavity, said body is elongated, adapted to conform to the rectangular shape of said conduits and to clamp said salient portions throughout their length and includes four long and generally straight, major body portions adapted to be connected to and bonded with four short and generally L-shaped, minor body portions at the corners of said conduits, ones of which major and minor body portions are provided with outstanding hollow lug portions conforming in shape to and adapted to fit longitudinally in the portions of said cavity within others of said major and minor body portions, and said means include a normally closed inlet valve adapted to be associated with said base portion of one of said major and minor body portions to permit entry of solidifiable fluid into said cavity during expansion and filling thereof, and a normally closed outlet valve adapted to be associated with said base portion of one or said major and minor body portions and to permit expulsion of gas from said cavity during expansion and filling thereof.

References Cited

UNITED STATES PATENTS

| 829,546 | 8/1906 | Schou | 277—226 |
|---|---|---|---|
| 2,430,873 | 11/1947 | Haas | 52—403 X |
| 2,700,196 | 1/1955 | Panhard | 277—226 X |
| 2,761,536 | 9/1956 | Bradley | 52—2 X |
| 2,814,841 | 12/1957 | Brugler | 52—403 X |
| 3,191,727 | 6/1965 | Schmeltz et al. | 52—403 X |
| 3,258,271 | 6/1966 | Hollingsworth | 277—34.3 X |
| 3,316,681 | 5/1967 | Eber | 49—477 X |

FOREIGN PATENTS

| 1,106,161 | 7/1955 | France. |
|---|---|---|
| 29,727 | 12/1884 | Germany. |

THOMAS F. CALLAGHAN, Primary Examiner

U.S. Cl. X.R.

49—477; 52—2, 403; 248—74; 277—34.3, 226; 285—97, 61, 398

PO-1050
(5/69)

UNITED STATES PATENT OFFICE
CERTIFICATE OF CORRECTION

Patent No. 3,473,829   Dated October 21, 1969

Inventor(s) Dennis Daniels

It is certified that error appears in the above-identified patent and that said Letters Patent are hereby corrected as shown below:

Column 5, line 73, after "laterally", insert --slightly--.
Column 6, line 59, change "moulded" to --molded--.
Column 9, line 40, claim 4, change "nose" to --neck--.

SIGNED AND
SEALED
FEB 17 1970

(SEAL)
Attest:

Edward M. Fletcher, Jr.
Attesting Officer

WILLIAM E. SCHUYLER, JR.
Commissioner of Patents